Patented Oct. 21, 1952

2,615,056

UNITED STATES PATENT OFFICE 2,615,056

PROCESS FOR ISOMERIZATION OF AROMATIC COMPOUNDS

Joseph E. Nickels, Pittsburgh, Pa., assignor to Koppers Company, Inc., Pittsburgh, Pa., a corporation of Pennsylvania No Drawing. Application October 2, 1947, Serial No. 777,582

17 Claims. (Cl. 260—668)

This invention relates to chemical processes and is particularly directed to catalytic isomerizing processes in which an isomerizable position isomer of an aromatic compound is brought into contact with a catalyst comprising an aluminum salt of a fluorine acid selected from the class consisting of hydrofluoric acid per se and hydrofluoric acid in complex combination as a Werner complex at a reactive temperature sufficient to convert a portion of said isomer to another position isomer.

It is known that various catalytic reactions may be effected by means of Friedel-Crafts catalysts. Aluminum chloride, for example, is commonly used for alkylations, isomerizations and like catalytic reactions. Aluminum chloride, however, cannot be utilized in fixed-bed catalysts in liquid phase reactions of aromatic hydrocarbons because of the solubility of aluminum chloride in such hydrocarbons. For the same reason it is difficult to separate aluminum chloride from the catalysate in such liquid phase processes. Likewise, the high vapor pressure of aluminum chloride further complicates such separations and, moreover, imposes a severe limitation on vapor phase reactions over fixed-bed catalysts. Thus, in such reactions the temperature must be maintained low or the pressure high to prevent undue loss of aluminum chloride by vaporization.

I have now found that aluminum salts of fluorine acids selected from the class consisting of hydrofluoric acid per se and hydrofluoric acid in complex combination as a Werner complex may be utilized to effect isomerization catalysis of isomerizable position isomers of aromatic compounds without any of the disadvantages characteristic of aluminum chloride and related Friedel-Crafts type catalyst. By position isomer of an aromatic compound I mean an aromatic compound containing at least one substituent capable of attachment at two or more isomerically different positions on the aromatic nucleus.

The catalysts useful in the present invention are aluminum salts of hydrofluoric acid per se or hydrofluoric acid in complex combination as a Werner complex. This includes such compounds as aluminum fluoride, aluminum fluosilicate, aluminum fluoborate, etc. and excludes compounds such as sodium fluoaluminate. The latter is the sodium salt of a fluorine acid; namely, hydrofluoaluminate, and within the meaning of the terms used herein is not an aluminum salt of either hydrofluoric acid or hydrofluoric acid in complex combination as a Werner complex.

The invention may be more fully understood by reference to the following examples in which the parts are by weight and the duration is 12 hours unless otherwise specified.

Example I

A procatalysate consisting in a mixture of ethylnaphthalenes obtained by ethylation of naphthalene with ethylene over an iron phosphate catalyst and containing about 3.5 polyethylnaphthalenes and about 96.5 ethylnaphthalenes, of which about 50.7% was alpha ethylnaphthalene and about 49.3% was beta ethylnaphthalene, was vaporized and preheated to a temperature of about 425° C. The vapors were then passed through a catalyst bed charged with pelleted aluminum fluoride at a liquid hourly space velocity of 0.5; i. e., at a rate equal to 0.5 volume of liquid ethylnaphthalenes per volume of catalyst per hour. The product distribution was found to be 99.1% liquid, 0.5% carbon, and 0.4% naphthalene. The composition of the liquid was found to be 94% ethylnaphthalenes, 3.7% polyethylnaphthalenes, and 2.7% naphthalene. The isomer distribution was found to be 82.8% beta isomer and 17.2% alpha isomer. The percent alpha ethylnaphthalene isomerized was 61.9.

The catalyst used in this example was technical aluminum fluoride obtained from the Harshaw Chemical Company. It was crushed, screened and pelleted in the form of ⅛ inch by ⅛ inch pellets, using 4% aluminum stearate as a die lubricant. The pellets were heated in a stream of air at 600° C. to remove organic materials before use as catalyst.

Example II

The process of Example I was repeated with a duration of 60 hours. The product distribution was found to be 100% liquid. The composition liquid was found to be 98% ethylnaphthalenes, 1.4% polyethylnaphthalenes and 0.6 naphthalene. The isomer distribution was found to be 78.6% beta isomer and 21.4% alpha isomer. The percent alpha ethylnaphthalene isomerized was 51.8.

Example III

The process of Example I was repeated using aluminum fluosilicate as the catalyst. Granular aluminum fluosilicate obtained from the City Chemical Corporation was sieved to 4–8 mesh. Using this catalyst the product distribution was found to be 99.1% liquid and 0.9% carbon. The composition of the liquid was found to be 98.2% ethylnaphthalenes, 1.6% polyethylnaphthalenes and 0.2% naphthalenes. The isomer distribution was found 80.7% beta isomer and 19.3% alpha isomer. The percent alpha ethylnaphthalene isomerized was 66.0.

In the foregoing examples, both the temperature and the rate of throughput may be varied. Suitably, the temperature may range from 300 to 600° C. and the throughput from 0.1 to 10 volumes of liquid ethyl naphthalene per volume of catalyst per hour. The pressure also may be varied from atmospheric, either to below or above atmospheric. Generally speaking, with higher pressures, lower temperatures will suffice. If the pressure is high enough, the reaction may be carried out in the liquid phase. However carried out, the catalyst is neither dissolved nor vaporized in the process.

*Example IV (N9–20)*

The process of Example I was repeated using as procatalysate, a redistilled methylnaphthalene mixture containing 71.2% beta methylnaphthalene at a liquid hourly space velocity of 0.46. The product distribution was 0.1% gases, 99.6% liquids and 0.3% carbon. The composition of the liquid was 98.2% methylnaphthalenes and 1.8% polymethylnaphthalene. The percent alpha methylnaphthalene isomerized was 16.3.

*Example V (N9–23)*

The process of Example IV was repeated using as procatalysate a redistilled methylnaphthalene mixture containing 67.2% beta methylnaphthalene. The product distribution was 99% liquid, 0.1% gases, and 0.9% carbon. The composition of liquid was 98.4% methylnaphthalenes and 1.6% polymethylnaphthalenes. The methylnaphthalenes analyzed 69.5% beta methylnaphthalene. The percent alpha methylnaphthalene isomerized was 20.6.

The procedures of the foregoing examples are also applicable to other alkyl naphthalenes such as isopropyl naphthalene, normal and secondary butyl naphthalene, normal and isoamyl naphthalene and the like. With all but the first of these compounds isomerization of the side chain also takes place giving a predominance of the tertiary alkyl form.

*Example VI (N9–45)*

The procedure of Example I was repeated using ortho-xylene as the procatalysate, a temperature of 475° C. and a liquid hourly space velocity of 0.36 (10 seconds contact time). The ortho-xylene feed analyzed 94.7% ortho-xylene and 5.3% para-xylene. The product distribution was found to be 84.2% ortho-xylene, 11.2% meta-xylene and 4.6% para-xylene.

*Example VII (N9–46)*

The process of Example VI was repeated using 100% para-xylene as the procatalysate. The temperature was 525° C. The product distribution was found to be 88.1% para-xylene, and 11.9% meta-xylene.

*Example VIII (N9–56)*

The procedure of Example I was repeated using ortho-cresol as the procatalysate. The temperature was 500° C., the length of the run was 10 hours and the liquid hourly space velocity was 0.23 (contact time, 15 seconds). The product distribution was found to be 97.1% liquid, 1% gases and 1.9% carbon. The composition of the liquid was found to be 83.9% cresols, 6.8% phenol and 9.3% polymethyl phenols. The composition of the cresols was found to be 75.4% ortho-cresol, 15% meta-cresol and 9.1% para-cresol.

*Example IX (N9–57)*

The process of Example VIII was repeated using aluminum fluosilicate as the catalyst. The product distribution was 98.5% liquid, 1.5% carbon and 0.5% gases. The composition of the liquid was 85.3% cresols, 6.7% phenol and 8.0% polymethylphenols. The composition of the cresols was 78.8% ortho-cresol, 15.2% meta-cresol, and 6.0% para-cresol.

*Example X (N18–39)*

The procedure of Example I was repeated using meta-ethyl-phenol as the procatalysate. The temperature was 450° C., the liquid hourly space velocity was 0.52, the length of the run was 4 hours. The product distribution was 92.2% liquid, 6% carbon and 1.8% gases. The composition of the liquid was found to be 72% ethylphenols, 17.5% phenol and 10.5% polyethylphenols. The distribution of the ethylphenols was found to be 12.8% ortho, 75.7% meta, and 11.5% para.

*Example XI*

The process of Example X was repeated using ortho-ethyl-phenol as the feed. The liquid hourly space velocity was 0.56, the temperature 450° C. and the duration 8 hours. The product distribution was 96.3% liquid, 1.7% carbon, 2% gases. The composition of the liquid was found to be 57.5% ethylphenol, 25.6 phenol, 16.9% polyethylphenols. The distribution of the isomers was found to be 46.6% ortho, 38.9% meta, and 14.5% para.

*Example XII (N18–43)*

The procedure of Example X was repeated using para-ethylphenol; the temperature was 450° C.; the liquid hourly space velocity was 0.48; the duration was 8 hours. The product distribution 96.1% liquid, 1.9% carbon, and 2% gases. The composition of the liquid was 61.6% ethylphenols, 19.8% phenol, 18.6% polyethylphenols. The distribution of the isomers was 16.9% ortho, 48.5% meta, and 34.6% para.

The foregoing examples are illustrative of typical applications of aluminum fluorides as isomerization catalysts. They show that they are effective in promoting isomerization in widely different types of materials. They show that the aluminum fluorides are particularly effective in isomerization of alkyl naphthalenes. In this regard, attention is invited to the unusually low decomposition. Note particularly Example II where after 60 hours only 2% of the ethylnaphthalenes was decomposed. Note also Examples III and IV where similarly good results are obtained. Note also that, as shown by Example II, the catalyst has unusually long life at high activity.

While I have described my invention with reference to particular embodiments, it will be understood that it is not limited to any of the particularities thereof except as pointed out in the appended claims and that it may be variously embodied within the spirit and scope of the invention.

I claim:

1. In a process for catalytic isomerization, the steps of bringing a procatalysate containing predominantly an aromatic compound containing at least one substituent capable of attachment at two or more isomerically different positions on the aromatic nucleus in contact with a catalyst comprising an aluminum salt of a fluorine acid selected from the class consisting of hydrofluoric acid per se and hydrofluoric acid in complex combination as a Werner complex at a reactive temperature sufficient to change the isomer distribution in said procatalysate.

2. The process of claim 1 in which the aluminum salt is aluminum fluoride.

3. The process of claim 2 in which the substituent is an alkyl group and the aromatic nucleus is a naphthalene nucleus.

4. The process of claim 1 in which the aluminum salt is aluminum fluosilicate.

5. The process of claim 4 in which the substituent is an alkyl group and the aromatic nucleus is a naphthalene nucleus.

6. The process of claim 1 in which the substituent is an alkyl group.

7. The process of claim 1 in which the substituent is an alkyl group and the aromatic nucleus is a naphthalene nucleus.

8. In a catalytic isomerization process, the step of bringing procatalysate consisting essentially of isomerizable mono-ethylnaphthalene into contact with a catalyst comprising an aluminum salt of a fluorine acid selected from the class consisting of hydrofluoric acid per se and hydrofluoric acid in complex combination as a Werner complex at a reactive temperature sufficient to change the isomer distribution in the procatalysate.

9. The process of claim 8 in which the temperature is between 300 and 600° C. and the liquid hourly space velocity is between 0.1 and 10.

10. The process of claim 9 in which the pressure is atmospheric.

11. The process of claim 10 in which the aluminum salt is aluminum fluoride.

12. The process of claim 10 in which the aluminum salt is aluminum fluosilicate.

13. The process for isomerizing alpha-ethylnaphthalene to beta-ethylnaphthalene in a substantially equal mixture of the two isomers which comprises bringing a mixture containing substantially equal amounts of alpha- and beta-ethylnaphthalenes into contact with a catalyst comprising an aluminum salt of a fluorine acid selected from the class consisting of hydrofluoric acid per se and hydrofluoric acid in complex combination as a Werner complex and a reactive temperature sufficient to change the isomer distribution in the mixture.

14. The process of claim 13 in which the temperature is between 300° C. and 600° C. and the liquid hourly space velocity is between 0.1 and 10.

15. The process of claim 14 in which the pressure is atmospheric.

16. The process of claim 14 in which the aluminum salt is aluminum fluoride.

17. The process of claim 14 in which the aluminum salt is aluminum fluosilicate.

JOSEPH E. NICKELS.

REFERENCES CITED

The following references are of record in the file of this patent:

UNITED STATES PATENTS

| Number | Name | Date |
|---|---|---|
| 2,301,913 | Veltman | Nov. 17, 1942 |
| 2,337,123 | Olin et al. | Dec. 21, 1943 |
| 2,399,780 | Arnold | May 7, 1946 |
| 2,399,781 | Arnold | May 7, 1946 |
| 2,416,965 | Thomas et al. | Mar. 4, 1947 |
| 2,422,798 | Pines | June 24, 1947 |
| 2,425,559 | Passino et al. | Aug. 12, 1947 |
| 2,428,923 | Thomas et al. | Oct. 14, 1947 |

FOREIGN PATENTS

| Number | Country | Date |
|---|---|---|
| 478,601 | Great Britain | Jan. 21, 1938 |

OTHER REFERENCES

Dobryanskii et al., "Mechanism of Aromatization and Xylene Thermal Isomerization." Oil and Gas Jour., Aug. 8, 1940, p. 48.

Egloff et al., Isomerization of Pure Hydrocarbons, Reinhold Pub. Corp., New York (1942) pages 190, 191, 386, 387, 467, 469 (6 pages).

Sachanen, Chemical Constituents of Petroleum, Reinhold Pub. Corp., New York (1945) page 201.